United States Patent [19]

Shinoda

[11] Patent Number: 5,274,737
[45] Date of Patent: Dec. 28, 1993

[54] REFERENCE PATTERN ADAPTING DEVICE TRAINABLE BY A SMALL NUMBER OF TRAINING PATTERNS

[75] Inventor: Koichi Shinoda, Tokyo, Japan
[73] Assignee: NEC Corporation, Tokyo, Japan
[21] Appl. No.: 738,641
[22] Filed: Jul. 31, 1991

[30] Foreign Application Priority Data

Jul. 31, 1990 [JP] Japan .................. 2-203437

[51] Int. Cl.$^5$ ............................................. G10L 5/06
[52] U.S. Cl. ....................................................... 395/2
[58] Field of Search ......................... 395/2; 381/41–43

[56] References Cited

FOREIGN PATENT DOCUMENTS 0146434 6/1985 European Pat. Off. .
0301199 2/1989 European Pat. Off. .

OTHER PUBLICATIONS

L. R. Rabiner et al., "An Introduction to Hidden Markov Models", IEEE ASSP Magazine, Jan. 1986, pp. 4–16.
S. Furui, "A Training Procedure . . . Recognition Systems", IEEE Transactions on Acoustics, Speech, and Signal Processing, vol. ASSP-28, No. 2, Apr. 1980, pp. 129–136.
Shinoda et al., "Speaker Adaptation for Demi-Syllable Based Continuous Density HMM", IEEE Int'l Conf. on Acoustics, Speech and Signal Processing, vol. 2, May 1991, pp. 857–860.
Furui, "Unsupervised Speaker Adaptation Method Based on Hierarchical Spectral Clustering", Int'l Conf. on Acoustics, Speech and Signal Processing, vol. 1, May 22, 1989, pp. 286–689.
Bonneau, "Vector Quantization for Speaker Adaptation", Int'l Conf. on Acoustics, Speech and Signal Processing, vol. 3, Apr. 6, 1987, pp. 1434–1437.
Shiraki, "Speaker Adaptation Algorithms Based on Piece-Wise Moving Adaptive Segment", Int'l Conf. on Acoustics, Speech and Signal Processing, vol. 2, Apr. 3, 1990, pp. 657–660.

*Primary Examiner*—David D. Knepper
*Attorney, Agent, or Firm*—Sughrue, Mion, Zinn, Macpeak & Seas

[57] ABSTRACT

In a reference pattern adapting device for adapting reference pattern parameter groups (1-M) to adapted reference pattern parameter groups (1-M) by using training patterns (1-L) derived from a training pattern signal (TP). A similarity calculating unit (15) calculates a group of primary degrees of similarity between (a) each of M reference pattern element groups representative of reference patterns (output of a vector group memory 11) and (b) each of M reference pattern parameter groups (output of pattern parameter memory 12). A difference calculating unit (16) calculates a group of differences between reference pattern elements of each of the M reference pattern element groups and training pattern elements of each of L training pattern element groups representative of the training patterns (1-L). A first calculating unit (21) calculates a primary difference value by using the group of primary degrees of similarity and the group of differences. A second calculating unit (22) calculates a group of primary mean values by using each of L reference pattern parameter groups and the group of differences. The resulting group of primary mean values is output to an identifier (25) as one of L adapted pattern parameter groups.

5 Claims, 6 Drawing Sheets

REFERENCE PATTERN ADAPTING DEVICE TRAINABLE BY A SMALL NUMBER OF TRAINING PATTERNS

BACKGROUND OF THE INVENTION

This invention relates to a reference pattern adapting device for adapting a plurality of reference patterns to a plurality of adapted patterns by using a small number of training patterns. Such a reference pattern adapting device is particularly useful in a pattern recognition device, such as a speech recognition device.

Such a pattern recognition device is for recognizing an input pattern as a recognized pattern by selecting pertinent ones from a plurality of reference patterns which represent categories of recognition objects, respectively. The input pattern is represented by a group of input feature vectors. When the pattern recognition device is a speech recognition device, the input pattern represents speech found. Each of the reference patterns is defined by a signal model. Various signal models of the type are already known. By way of example, a signal model is described in an article contributed by L. R. Rabiner and B. H. Juang to the IEEE ASSP MAGAZINE, January 1986, pages 4 to 16, under the title of "An Introduction to Hidden Markov Models". As will be understood from the title of the Rabiner et al article, the signal model of Rabiner et al is called a hidden Markov model (HMM). The hidden Markov model carries out modeling of the reference pattern on the assumption that the group of the input feature vectors is produced by Markov stochastic process. The hidden Markov model is characterized by a plurality of states and transitions between the states. Each state produces a pattern vector in accordance with a predetermined probability distribution. Each transition is accompanied by a predetermined state transition probability. A distance between the input pattern and the reference pattern is given by a likelihood so that the hidden Markov model generates the group of the input feature vectors.

In the pattern recognition device wherein the hidden Markov model is used, it is desirable on obtaining a high recognition rate to utilize the reference pattern adapting device mentioned above. The reference pattern adapting device is for adapting a first through M-th reference patterns to first through M-th adapted patterns by using first through L-th training patterns which correspond to the first reference pattern through an L-th reference pattern, respectively, where M represents a first integer, L representing a second integer which is not greater than the first integer. The first through the M-th reference patterns are characterized by first through M-th reference pattern parameter groups and are represented by first through M-th groups of reference feature vectors. The first through the L-th training patterns are represented by first through L-th groups of training feature vectors.

By way of example, a speaker adapting device is described in an article contributed by Sadaoki Furui to the IEEE Transactions on Acoustics, Speech, and Signal Processing of United States, Volume ASSP-28, No. 2, pages 129 to 136, under the title of "A Training Procedure for Isolated Word Recognition System". According to the Furui article, the speaker adapting device adapts the first reference pattern through an L-th reference pattern to the first adapted pattern through an L-th adapted pattern among the first through the M-th adapted patterns by using the first through the L-th training patterns. The speaker adapting device requires a plurality of correspondence relations between the first through the M-th reference patterns to get an $(L+1)$-th adapted pattern through the M-th adapted pattern among the first through the M-th adapted patterns. As for remaining ones of the first through the M-th reference patterns, an $(L+1)$-th reference pattern through the M-th reference pattern are adapted to the $(L+1)$-th through the M-th adapted patterns by using the plurality of correspondence relations. In order to obtain the plurality of correspondence relations, it is necessary that a large number of speakers utter vocabularies which correspond to the first through the L-th training patterns.

SUMMARY OF THE INVENTION:

It is an object of the present invention to provide a reference pattern adapting device capable of adapting reference patterns by using a small number of training patterns derived from utterances of a single speaker.

Other objects of the present invention will become clear as the description proceeds.

On describing the gist of this invention, it is possible to understand that a reference pattern adapting device is for using first through L-th training patterns in adapting first through M-th reference pattern parameter groups to first through M-th adapted pattern parameter groups, where M represents a first integer, L representing a second integer which is not greater than the first integer. The first through the M-th reference pattern parameter groups characterize first through M-th reference patterns. The first reference pattern parameter group through an L-th reference pattern parameter group are classified into a first class. An $(L+1)$-th reference pattern parameter group through the M-th reference pattern parameter group are classified into a second class.

According to this invention, the reference pattern adapting device comprises: (A) an element group memory for memorizing first through M-th groups of reference pattern elements as first through M-th memorized pattern element groups, the first through the M-th groups representing the first through the M-th reference patterns; (B) extracting means supplied with the first through the L-th training patterns for extracting a group of training pattern elements representative of one of the first through the L-th training patterns at a time from the first through the L-th training patterns, the group of training pattern elements corresponding to one of the first through the L-th reference pattern parameter groups; (C) a pattern parameter memory for memorizing the first through the M-th reference pattern parameter groups as first through M-th memorized pattern parameter groups; (D) correspondence establishing means connected to the element group memory and the extracting means for establishing correspondence between the reference pattern elements of each of the first memorized pattern element group through an L-th memorized pattern element group and the training pattern elements of the group into a plurality of pairs, the first through the L-th memorized pattern element groups representing the first reference pattern through an L-th reference pattern characterized by the first through the L-th reference pattern parameter groups, each of the pairs consisting of one of the reference pattern elements of each of the first through the L-th memorized pattern element groups and one of the training pattern elements that corresponds in the group of training pattern elements to the one of the reference pattern elements; (E) similarity calculating means connected to the element group memory and the pattern parameter memory for calculating a group of primary degrees of similarity between each of the first memorized pattern element group through an L-th memorized pattern element group and each of the first memorized pattern parameter group through an L-th memorized pattern parameter group to produce a group of primary calculation results representative of the group of primary degrees of similarity, the L-th memorized pattern element group being the L-th group of reference pattern elements which is memorized in the element group memory to represent an L-th reference pattern characterized by the L-th reference pattern parameter group, the L-th memorized pattern parameter group being the L-th reference pattern parameter group memorized in the pattern parameter memory; (F) difference calculating means connected to the correspondence establishing means for calculating a group of differences between the reference pattern elements and the training pattern elements in the plurality of pairs to produce a difference signal representative of the group of differences; (G) first calculating means connected to the similarity calculating means and the difference calculating means for calculating a group of primary difference values by using the group of primary degrees of similarity and the group of differences to produce a group of primary difference calculation results representative of the group of the primary difference values; (H) and second calculating means connected to the pattern parameter memory and the first calculating means for calculating a group of primary mean values by using the each of the first through the L-th memorized pattern parameter groups and the group of the primary difference values to produce a group of secondary calculation results representative of the group of primary mean values as one of the first adapted pattern parameter group through an L-th adapted pattern parameter group among the first through the M-th adapted pattern parameter groups.

DESCRIPTION OF THE PREFERRED EMBODIMENTS

Figure 1:
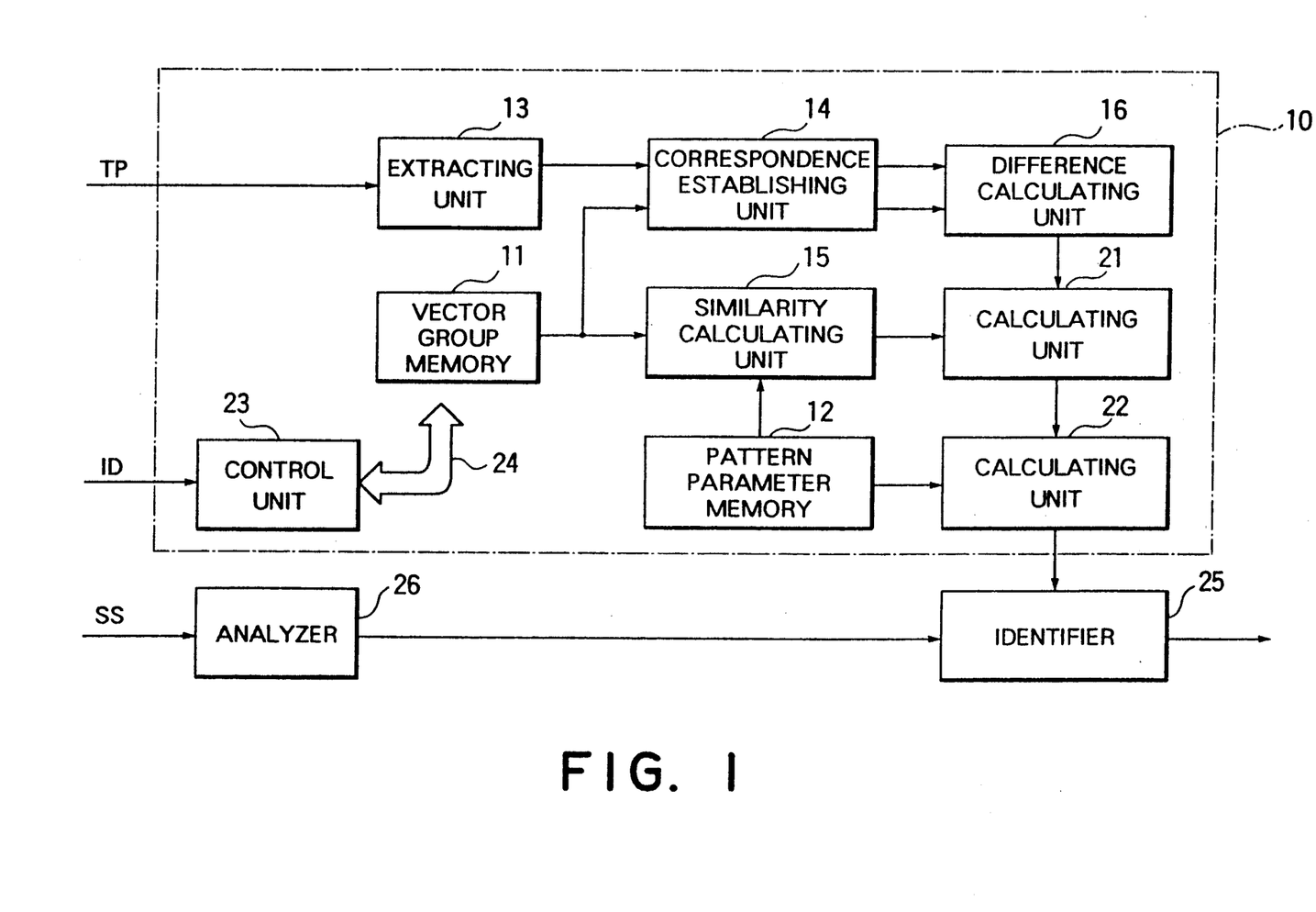
FIG. 1 is a block diagram of a pattern recognition device comprising a reference pattern adapting device according to a first embodiment of this invention.

Referring to FIG. 1, description will be made as regards a speech recognition device comprising a reference pattern adapting device 10 according to a first embodiment of this invention. As will later be described, the speech recognition device is for recognizing an input speech pattern of a speech signal SS as a recognized pattern by selecting pertinent ones from first through M-th adapted patterns which represent categories of recognition objects, respectively. The first through the M-th adapted patterns are derived from first through M-th reference patterns by using the reference pattern adapting device 10.

The reference pattern adapting device 10 is for adapting first through M-th reference pattern parameter groups characterizing the first through the M-th reference patterns to first through M-th adapted pattern parameter groups by using first through M-th training patterns which correspond to the first through the M-th reference patterns, respectively, where M represents a first integer which is not less than two. It is preferable that the first integer is approximately equal to, for example, two hundreds. It is to be noted here that the training patterns are equal in number to the reference patterns. The first through the M-th reference patterns represent first through M-th categories which may be first through M-th words W(1) to W(M). In order to obtain the first through the M-th training patterns, a single speaker utters the first through the M-th words W(1) to W(M).

Each of the first through the M-th reference patterns is defined by first through Ns-th states s(1) to s(Ns) where Ns represents a variable which is equal to a total number of the states and is variable, for example, between two hundreds and three hundreds in each reference pattern. The first through the M-th reference patterns are alternatively represented by first through M-th groups of reference pattern elements, respectively. Each of the reference pattern elements will be called a reference feature vector. The number of the reference feature vectors representative of each of the first through the M-th reference patterns is variable between 1 and Ni, where Ni is approximately equal to, for example, one hundred. Similarly, the first through the M-th training patterns are represented by first through M-th groups of training pattern elements, respectively. Each of the training pattern elements will be called a reference feature vector. The number of the training feature vectors representative of each of the first through the M-th training patterns is variable between 1 and Ti, where Ti is approximately equal to, for example, one hundred. Under the circumstances, the reference feature vectors of each of the first through the M-th groups will be called first through Ni-th reference feature vectors. Similarly, the training feature vectors of each of the first through the M-th groups will be called first through Ti-th training feature vectors. In an i-th state s(i), a k-th reference feature vector will be represented by Xik, where i represents a variable which is not greater than Ns, k representing a variable which is not greater than Ni. A k-th training feature vector will be represented by Yik.

It will be assumed that the reference pattern adapting device 10 utilizes a hidden Markov model mentioned heretobefore. The hidden Markov model is characterized by a plurality of states and transitions between the states which states are the first through the Ns-th states of each reference pattern. Each state is defined by the first through the Ni-th reference feature vectors in accordance with a predetermined probability distribution function. Each transition is accompanied by a predetermined state transition probability. It will be assumed that the predetermined probability distribution function is equivalent to a single Gaussian distribution function.

In the i-th state s(i), each of the first through the M-th reference patterns is characterized by a reference pattern parameter, such as an i-th mean vector $\mu_i$ of a Gaussian distribution, a covariance $\sigma_i^2$ of the Gaussian distribution, or a transition probability $a_{ij}$ between the i-th state s(i) and a j-th state s(j), where j represents a variable between i and Ns, both exclusive. In the example being illustrated, it will be assumed that the reference pattern adapting device 10 adapts the mean vector $\mu_i$ of the Gaussian distribution to an adapted mean vector which will be represented by $\mu_i'$.

The number of the reference pattern parameters representative of each of the first through the M-th reference patterns is variable between 1 to Ns. Under the circumstances, the reference pattern parameters of each of the first through the M-th reference pattern parameter groups will be called first through Ns-th reference pattern parameters. The first through the Ns-th reference pattern parameters are represented by first through Ns-th mean vectors $\mu_1$ to $\mu_{Ns}$, respectively.

In FIG. 1, the reference pattern adapting device 10 is supplied with a training pattern signal TP representative of a selected one of the first through the M-th training patterns and an identification signal ID indicative of the selected one of the first through the M-th training patterns. Let the reference pattern adapting device 10 be supplied with the training pattern signal TD representative of the first training pattern as a first pattern signal. In this event, the reference pattern adapting device 10 is supplied with the identification signal ID indicative of the first training pattern as a first identification signal.

The reference pattern adapting device 10 comprises a vector group memory 21, a pattern parameter memory 12, an extracting unit 13, a correspondence establishing unit 14, a similarity calculating unit 15, a difference calculating unit 16, a first calculating unit 21, a second calculating unit 22, and a control unit 23. The control unit 23 is for controlling the above-mentioned units 11 to 16, 21, and 22 through a control connection 24 (depicted by parallel connections bidirectionally having arrowheads) at various time instants in the manner which will become clear as the description proceeds.

The vector group memory 11 memorizes the first through the M-th groups of reference feature vectors as first through M-th memorized feature vector groups. The vector group memory 11 serves as an element group memory. The pattern parameter memory 12 memorizes the first through the M-th reference pattern parameter groups as first through M-th memorized pattern parameter groups.

Supplied with the first pattern signal, the extracting unit 13 extracts the first group of training feature vectors representative of the first training pattern as a first extracted vector group. The first extracted vector group corresponds to the first group of reference feature vectors and consists of the first through the Ti-th training feature vectors. The first extracted vector group is delivered to the correspondence establishing unit 14. When the first identification signal is supplied to the control unit 23, the control unit 23 activates the vector group memory 11 to make the vector group memory 11 supply the first memorized feature vector group to the correspondence establishing unit 14 and the similarity calculating unit 15. The first feature vector group consists of the first through the Ni-th reference feature vectors.

Supplied from the vector group memory 11 and the extracting unit 13 with the first memorized feature vector group and the first extracted vector group, the correspondence establishing unit 14 establishes correspondence between the first through the Ni-th reference feature vectors and the first through the Ti-th training feature vectors into first through Ni-th pairs in accordance with a DP (dynamic programming) matching method known in the art. Each of the first through the Ni-th pairs consists of one of the first through the Ni-th reference feature vectors and one of the first through the Ti-th training feature vectors that corresponds to that one of the first through the Ni-th reference feature vectors. The correspondence establishing unit 14 adds a label of the state to the training feature vectors and the reference feature vectors of each of the first through the Ni-th pairs. In the i-th state s(i), the first through the Ni-th pairs will be represented by a first labelled reference vector Xi1 and a first labelled training vector Yi1, a second labelled reference vector Xi2 and a second labelled training vector Yi2, . . . , a k-th labelled reference vector Xik and a k-th labelled training vector Yik, . . . , an (Ni-1)-th labelled reference vector Xi(Ni-1) and an (Ni-1)-th labelled training vector Yi(Ni-1), and an Ni-th labelled reference vector Xi(Ni) and an Ni-th labelled training vector Yi(Ni).

When the first identification signal is supplied to the control unit 23, the control unit 23 further activates the pattern parameter memory 12 to make the pattern parameter memory 12 supply the first memorized pattern parameter group to the similarity calculating unit 15. The first memorized pattern parameter group consists of the first through the Ns-th reference pattern parameters represented by the first through the Ns-th mean vectors. Supplied with the first memorized feature vector group and the first memorized pattern parameter group, the similarity calculating unit 15 calculates a group of primary degrees of similarity between the first memorized feature vector group and the first memorized pattern parameter group. More specifically, the similarity calculating unit 15 calculates a (k,i)-th distance $d_{ik}$ between the k-th labelled reference vector Xik among the first through the Ni-th labelled reference vectors Xi1 to Xi(Ni) and the i-th mean vector $\mu_i$ among the first through the Ns-th mean vectors $\mu_1$ to $\mu_{Ns}$ in accordance with the following equation:

$$d_{ik} = \|Xik - \mu_i\|^2. \qquad (1)$$

The distance $d_{ik}$ is well known in the art as the Euclidean distance, an inner product or the like. The similarity calculating unit 15 further calculates the primary degree of similarity $W_{ik}$ by using the following equation:

$$W_{ik} = (d_{ik})^{-m}, \qquad (2)$$

where m represents a positive integer which is less than ten. The primary degree of similarity may be called a weighting coefficient. The similarity calculating unit 15 repeats the above-mentioned calculations in connection with the first through the Ni-th reference feature vectors and the first through the Ns-th reference pattern parameters. Including a similarity calculation result register (not shown), the similarity calculating unit 15 memorizes the group of primary degrees of similarity as memorized primary degrees of similarity. The similarity calculating unit 15 may use the following equation (3) instead of the equation (2):

$$W_{ik} = C1 \exp(-C2 d_{ik}),  \quad (3)$$

where C1 and C2 represent first and second constants which are different from each other. Furthermore, the similarity calculating unit 15 may calculate a reduced number of primary degrees of similarity by using a likewise reduced number of reference feature vectors which are close to the first through the Ns-th mean vectors in distance. The similarity calculating unit 15 may carry out calculation operation by various other manners which are well known in the art.

The difference calculating unit 16 is supplied from the correspondence establishing unit 14 with the first through the Ni-th pairs. The difference calculating unit 16 calculates first through Ni-th differences between the first through the Ni-th labelled reference vectors Xi1 to Xi(Ni) and the first through the Ni-th labelled training vectors Yi1 to Yi(Ni), respectively. Including a difference calculation result register (not shown), the difference calculating unit 16 memorizes the first through the Ni-th differences as first through Ni-th memorized differences.

When the difference calculating unit 16 completes calculation of the first through the Ni-th differences, the control unit 23 activates the similarity calculating unit 15 to make the similarity calculating unit 15 supply a group of primary calculation results representative of the memorized primary degrees of similarity to the first calculating unit 21. Simultaneously, the control unit 23 activates the difference calculating unit 16 to make the difference calculating unit 16 supply a difference signal representative of the first through the Ni-th memorized differences to the first calculating unit 21. The first calculating unit 21 calculates a primary difference vector $\Delta_i$ by using the memorized primary degrees of similarity and the first through the Ni-th memorized differences in accordance with the following equation:

$$\Delta_i = \left[ \sum_{k=1}^{Ni} W_{ik}(X_{ik} - Y_{ik}) \right] / \left[ \sum_{k=1}^{Ni} W_{ik} \right]. \quad (4)$$

Including a first calculation result register (not shown), the first calculating unit 21 memorizes first through Ni-th primary difference vectors as first through Ni-th memorized primary difference vectors.

When the first calculating unit 21 completes calculation of the first through the Ni-th primary difference vectors, the control unit 23 activates the first calculating unit 21 to make the first calculating unit 21 supply a primary difference calculation result representative of one of the first through the Ni-th memorized primary difference vectors to the second calculating unit 22 as a selected one of the primary difference vectors. Simultaneously, the control unit 23 activates the pattern parameter memory 12 to make the pattern parameter memory 12 supply one of the first through the Ns-th mean vectors that corresponds, as a selected one of the mean vectors, to the selected one of the primary difference vectors. Supplied with the selected one of the primary difference vectors and the selected one of the mean vectors, the second calculating unit 22 calculates a primary mean vectors, as the adapted mean vector $\mu_i$ among the first adapted pattern parameter group, in accordance with the following equation:

$$\mu_i = \mu_i + \Delta_i. \quad (5)$$

The second calculating unit 22 produces a first group of secondary calculation results representative of a first group of primary mean vectors as the first adapted pattern parameter group. The first group of secondary calculation results are supplied to an identifier 25. The identifier 25 memorizes the first group of secondary calculation results as a first memorized parameter group.

The reference pattern adapting device 10 carries out adapting operation in connection with the second through the M-th groups of reference patterns by using the training pattern signal TP representative of each of the second through the M-th training patterns in the manner described above. The second calculating unit 22 produces a second group of secondary calculation results through an M-th group of secondary calculation results representative of a second group of primary mean vectors through an M-th group of primary mean vectors. The second group of primary mean vectors through the M-th group of primary mean vectors correspond to a second adapted pattern parameter group through the M-th adapted pattern parameter group, respectively. The identifier 25 memorizes the second group of secondary calculation results through the M-th group of secondary calculation results as a second memorized parameter group through an M-th memorized parameter group.

The speech recognition device further comprises an analyzer 26 which is supplied with the speech signal SS derived from an unknown utterance. The analyzer 26 analyzes the input speech pattern of the speech signal SS to produce a group of input feature vectors representative of the input speech pattern. The group of input feature vectors are supplied to the identifier 25. The identifier 25 compares the group of input feature vectors with the first through the M-th memorized parameter groups to identify the utterance in the manner known in the art. In this manner, the speech recognition device recognizes the input speech pattern as the recognized pattern.

Although the control unit 23 is supplied with the indication signal ID, the reference pattern adapting device may not use the indication signal ID. In this event, the correspondence establishing unit 14 establishes correspondence between the first through the Ni-th reference feature vectors and the first through the Ti-th training feature vectors into the first through the Ni-th pairs in accordance with the DP matching method and an automatic segmentation method known in the art. In other words, the correspondence establishing unit 14 decides which of the first through the Ni-th reference feature vectors belong to the first through the Ns-th states. Thus, the correspondence establishing unit 14 adds the label of the state to the training feature vectors and the reference feature vectors of each of the first through the Ni-th pairs.

Figure 2:
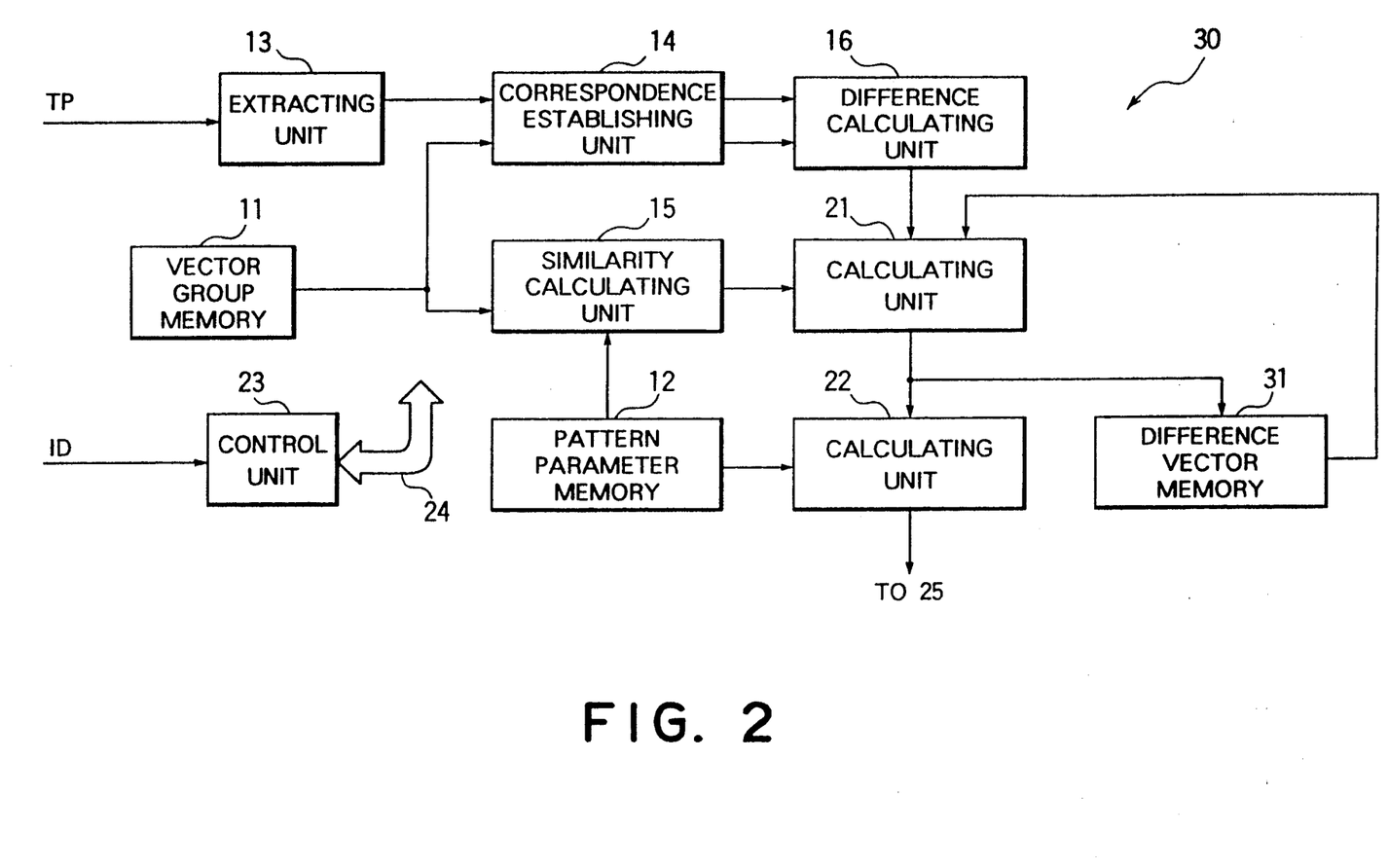
FIG. 2 is a block diagram of a reference pattern adapting device according to a second embodiment of this invention.

Referring to FIG. 2, the description will proceed to a reference pattern adapting device 30 according to a second embodiment of this invention.

The reference pattern adapting device 30 is for adapting the first through the M-th reference pattern parameter groups to the first through the M-th adapted pattern parameter groups by using the first training pattern through an L-th training pattern which correspond to the first reference pattern through an L-th reference pattern, respectively, where L represents a second integer which is not greater than the first integer M. It is preferable that the second integer is equal to, for example, one hundred and fifty. For this purpose, the reference pattern adapting device 30 comprises similar parts designated by like reference numerals and additionally a difference vector memory 31.

It is herein be assumed without loss of generality that the first reference pattern parameter group through an L-th reference pattern parameter group are classified into a first class or set A. An (L+1)-th reference pattern parameter group through the M-th reference pattern parameter group are classified into a second class or set B. Each of the first through the L-th reference patterns is characterized by each of the first through the L-th reference pattern parameter groups. Each of an (L+1)-th reference pattern through the M-th reference pattern is characterized by the (L+1)-th through the M-th reference pattern parameter groups. Each of the reference pattern parameters of each of the first through L-th reference pattern parameter groups represents an (A)j-th mean vector which will be represented by $\mu(A)j$. Each of the reference pattern parameters of each of the L-th through the M-th reference pattern parameter groups represents a (B)i-th mean vector which will be represented by $\mu(B)i$.

Similarly, each of the first adapted pattern through an L-th adapted pattern is characterized by the first adapted pattern parameter group through an L-th adapted pattern parameter group. Each of the adapted pattern parameters of each of the first through the L-th adapted pattern parameter groups represents an (A)j-th adapted mean vector which will be represented by $\mu(A)j$ and may be called a primary mean vector. Each of an (L+1)-th adapted pattern through the M-th adapted pattern is characterized by (L+1)-th adapted pattern parameter group through the M-th adapted pattern parameter group. Each of the adapted pattern parameters of each of the (L+1)-th through the M-th adapted pattern parameter groups represents a (B)i-th adapted mean vector which will be represented by $\mu(B)i$ and may be called a secondary mean vector.

Like the reference pattern adapting device 10 illustrated with reference to FIG. 1, the reference pattern adapting device 30 adapts the first through the L-th reference pattern parameter groups to the first through the L-th adapted pattern parameter groups by using the first through the L-th training patterns. As a result of adaptation, the second calculating unit 22 produces the first group of secondary calculation results through an L-th group of secondary calculation results representative of the first group of primary mean vectors through an L-th group of primary mean vectors. Each of the first through the L-th group of primary mean vectors corresponds to each of the first through the L-th adapted pattern parameter groups. The reference pattern adapting device 30 further adapts the (L+1)-th through the M-th reference pattern parameter groups to the (L+1)-th through the M-th adapted pattern parameter groups in a manner which will presently be described.

When the second calculating unit 22 completes calculation of the first through the L-th group of primary mean vectors, the control unit 23 activates the first calculating unit 21 to make the first calculating unit 21 supply the primary difference calculation results representative of the first through the Ni-th memorized primary difference vectors to the difference vector memory 31. The difference vector memory 31 memorizes the first through the Ni-th memorized primary difference vectors as first through Ni-th memorized difference vectors.

Simultaneously with supply of the primary calculation results, the control unit 23 activates the pattern parameter memory 12 to make the pattern parameter memory 12 supply the first through the M-th memorized pattern parameter groups to the similarity calculating unit 15. Supplied with the first through the M-th memorized pattern parameter groups, the similarity calculating unit 15 calculates a group of secondary degrees of similarity between each of the first through the L-th memorized pattern parameter groups and each of the (L+1)-th through the M-th memorized pattern parameter groups besides calculation of the group of primary degrees of similarity described in conjunction with FIG. 1. More specifically, the similarity calculating unit 15 calculates a distance $d(B)ij$ between the (A)j-th mean vector $\mu(A)j$ among the first through the L-th reference pattern parameter groups and the (B)i-th mean vector $\mu(B)i$ among the L-th through the M-th reference pattern parameter groups in accordance with the following equation:

$$d(B)ij = \|\mu(B)i - \mu(A)j\|^2. \qquad (6)$$

Subsequently, the similarity calculating unit 15 calculates a secondary degree of similarity $W(B)ij$ in accordance with the following equation:

$$W(B)ij = (d(B)ij)^{-p}, \qquad (7)$$

where p represents a positive constant. The similarity calculating unit 15 delivers a group of secondary calculation results representative of the group of secondary degrees of similarity to the first calculating unit 21. Simultaneously with delivery of the group of secondary calculation results, the control unit 23 activates the difference vector memory 31 to make the difference vector memory 31 supply the first through the Ni-th memorized difference vectors to the first calculating unit 21.

Supplied with the group of secondary degrees of similarity and the first through the Ni-th memorized difference vectors, the first calculating unit 21 calculates a secondary difference vector $\Delta(B)i$ in accordance with the following equation:

$$\Delta(B)i = \sum_{j \in A} W(B)ij[\mu(A)j - \mu(A)j] / \left[\sum_{j \in A} W(B)ij\right]. \qquad (8)$$

The first calculating unit 21 memorizes a group of secondary difference vectors as memorized secondary difference vectors.

When the first calculating unit 21 completes calculation of the secondary difference vector $\Delta(B)i$, the control unit 23 activates the first calculating unit 21 to make the first calculating unit 21 supply a secondary difference calculation result representative of one of the group of the secondary difference vectors to the second calculating unit 22. Simultaneously with activation of the first calculating unit 21, the control unit 23 activates the pattern parameter memory 12 to make the pattern parameter memory 12 supply the (B)i-th mean vector $\mu(B)i$ of one of the L-th through the M-th reference pattern parameter groups to the second calculating unit 22. The second calculating unit 22 calculates a group of secondary mean vectors by using the group of the secondary difference vectors and the mean vector μ(B)i in accordance with the following equation:

$$\mu(B)i = \mu(B)i + \Delta(B)i \qquad (9)$$

The second calculating unit 22 produces another group of secondary calculation results representative of the group of secondary mean vectors as one of the (L+1)-th through the M-th adapted pattern parameter groups.

In this manner, the (L+1)-th through the M-th reference pattern parameter groups are adapted to the (L+1)-th through the M-th adapted pattern parameter groups by using the pattern parameter memory 12, the similarity calculating unit 15, the first and the second calculating units 21 and 22, and the difference vector memory 31.

Figure 3:
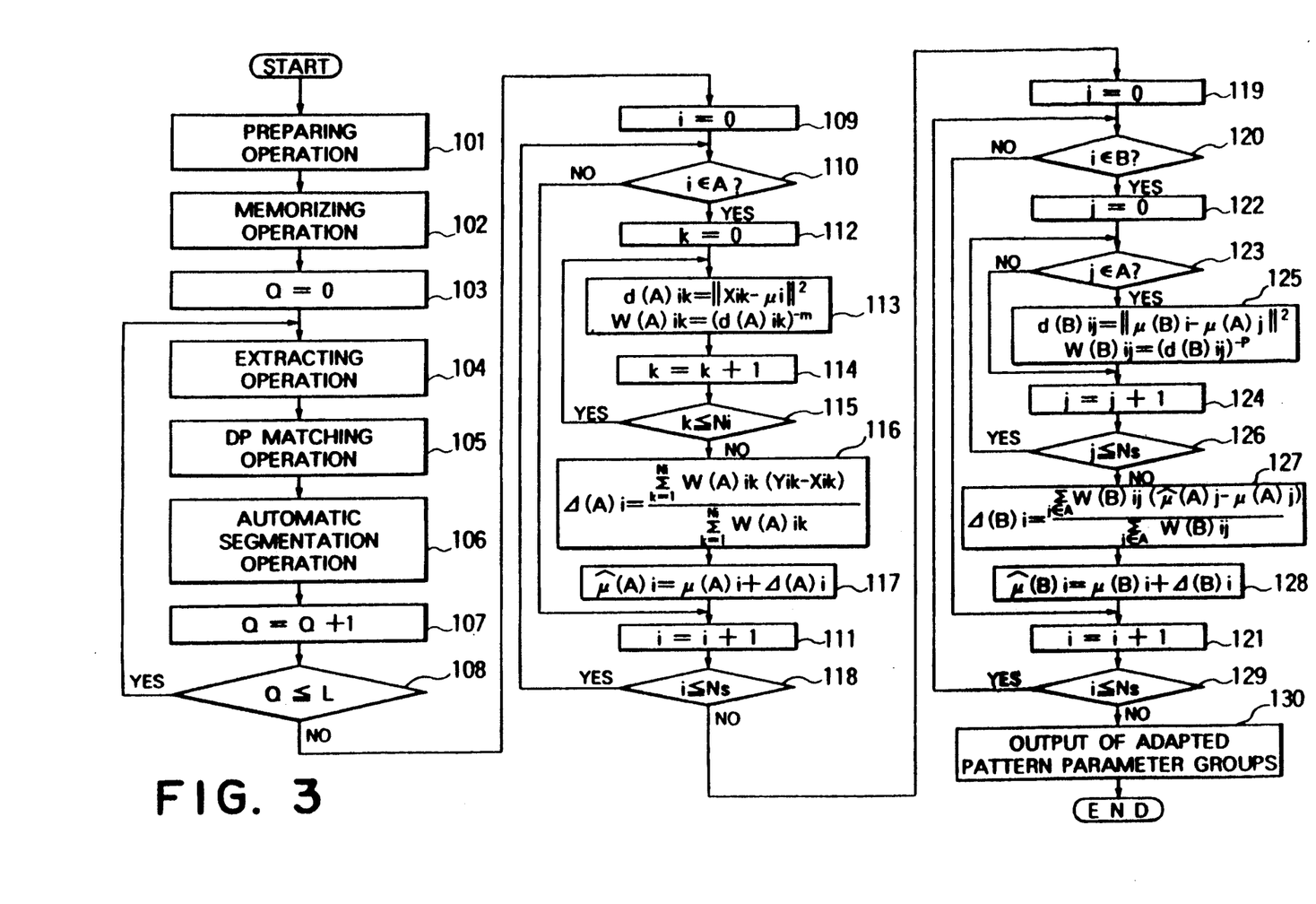
FIG. 3 is a flow chart for use in describing operation of the reference pattern adapting device illustrated in FIG. 2.

Referring to FIG. 3 together with FIG. 2, the description will proceed to adapting operation.

At a first step 101, the first through the M-th reference patterns and the first through the L-th training patterns are prepared. At a second step 102, the first through the M-th groups of reference feature vectors are memorized in the vector group memory 11 as the first through the M-th memorized feature vector groups. The first through the M-th reference pattern parameter groups are memorized in the parameter memory 12 as the first through the M-th memorized pattern parameter groups. At a third step 103, the control unit 23 clears a counted value Q of a training pattern counter (not shown) for counting the number of the training patterns. At a fourth step 104, the extracting unit 13 extracts the first group of training feature vectors as the first extracted vector group. At a fifth step 105, the correspondence establishing unit 14 establishes correspondence between the first through the Ni-th reference feature vectors and the first through the Ti-th training feature vectors to provide the first through the Ni-th pairs in accordance with the DP matching method.

At a sixth step 106, the correspondence establishing unit 14 adds the label of the state to the training feature vectors and the reference feature vectors of each of the first through the Ni-th pairs in accordance with the automatic segmentation method. In case where the indication signal ID is supplied to the control unit 23, the sixth step 106 is omitted. The sixth step 106 proceeds to a seventh step 107 at which one is added to the counted pattern value Q. The seventh step 107 is succeeded by an eighth step 108 for detecting whether or not the counted pattern value Q is not greater than L. When the counted pattern value Q is not greater than L, the eighth step 108 turns back to the fourth step 104. Otherwise, the eighth step 108 is followed by a ninth step 109.

At the ninth step 109, the variable i is initialized to zero. The ninth step 109 is succeeded by a tenth step 110. The tenth step 110 is for judging whether or not the j-th state s(j) is included in the first class A. When the j-th state s(j) is not included in the first class A, the tenth step 110 is followed by an eleventh step 111. If the j-th state s(j) is included in the first class A, the tenth step 110 is succeeded by a twelfth step 112.

At the twelfth step 112, the variable k is initialized to zero. The twelfth step 112 is followed by a thirteenth step 113. At the thirteenth step 113, the difference calculating unit 16 calculates the first through the Ni-th differences in the manner described in conjunction with FIG. 1. Subsequently, the similarity calculating unit 15 calculates the group of primary degrees of similarity in accordance with Equations (1) and (2). The thirteenth step 113 proceeds to a fourteenth step 114 at which one is added to the variable k.

The fourteenth step 114 is succeeded by a fifteenth step 115 for detecting whether or not the variable k is not greater than Ni. When the variable k is not greater than Ni, the fifteenth step 115 turns back to the thirteenth step 113. Otherwise, the fifteenth step 115 is followed by a sixteenth step 116.

At the sixteenth step 116, the first calculating unit 21 calculates the primary difference vectors in accordance with Equation (4). The sixteenth step 116 is followed by a seventeenth step 117.

At the seventeenth step 117, the second calculating unit 22 calculates the primary mean vectors in accordance with Equation (5). The seventeenth step 117 is succeeded by the eleventh step 111 at which one is added to the variable i. The eleventh step 111 as followed by an eighteenth step 118 for detecting whether or not the variable i is not greater than Ns. When the variable i is not greater than Ns, the eighteenth step 118 turns back to the tenth step 110. The tenth through the eighteenth steps are repeated in connection with the first through the Ns-th states until the variable i becomes greater than Ns. When the variable i becomes greater to Ns, the eighteenth step 118 is followed by a nineteenth step 119.

It is to be noted here that the first through the eighteenth steps 101 to 118 are for adapting the first through the L-th reference pattern parameter groups to the first through the L-th adapted pattern parameter groups by using the first through the L-th training patterns in the manner described with reference to FIG. 1.

At the nineteenth step 119, the variable i is initialized to zero. The nineteenth step 119 is succeeded by a twentieth step 120. The twentieth step 120 is for judging whether or not the i-th state s(i) is included in the second class B. When the i-th state s(i) is not included in the second class B, the twentieth step 120 is followed by a twenty-first step 121. If the i-th state s(i) is included in the second class B, the twentieth step 120 is succeeded by a twenty-second step 122 at which the variable j is initialized to zero.

The twenty-second step 122 is succeeded by a twenty-third step 123 for judging whether or not the j-th state s(j) is included in the first class A. When the j-th state s(j) is not included in the first class A, the twenty-third step 123 is followed by a twenty-fourth step 124. If the j-th state s(j) is included in the first class A, the twenty-third step 123 is succeeded by a twenty-fifth step 125.

At the twenty-fifth step 125, the similarity calculating unit 15 calculates the group of secondary degrees of similarity in accordance with Equations (6) and (7). The twenty-fifth step 125 is followed by the twenty-fourth step 124 at which one is added to the variable j. The twenty-fourth step 124 is succeeded by a twenty-sixth step 126 for judging whether or not the variable j is not greater than Ns. When the variable j is not greater than Ns, the twenty-sixth step 126 turns back to the twenty-third step 123. If the variable j becomes greater than Ns, the twenty-sixth step is succeeded by a twenty-seventh step 127.

At the twenty-seventh step 127, the first calculating unit 21 calculates the secondary difference vector μ(B)i in accordance with Equation (8). The twenty-seventh step 127 is followed by a twenty-eighth step 128.

At the twenty-eight step 128, the second calculating unit 22 calculates the group of secondary mean vectors in accordance with Equation (9). The twenty-eight step 128 is succeeded by the twenty-first step 121 at which one is added to the variable i. The twenty-first step 121 is followed by a twenty-ninth step 129 which is for judging whether or not the variable i is not greater than Ns. If the variable i is not greater than Ns, the twenty-ninth step 129 turns back to the twentieth step 120. When the variable i becomes greater than i, the twenty-ninth step 129 is succeeded by a thirtieth step 130. The twentieth through the twenty-ninth steps 120 to 129 are repeated in connection with the first through the Ns-th states until the variable i becomes greater than Ns.

At the thirtieth step 130, the second calculating unit 22 produces the (L+1)-th through the M-th adapted pattern parameter groups. It is to be noted here that the nineteenth through the twenty-ninth steps 119 to 129 are for adapting the (L+1)-th through the M-th reference pattern parameter groups to the (L+1)-th through the M-th adapted pattern parameter groups.

Figure 4:
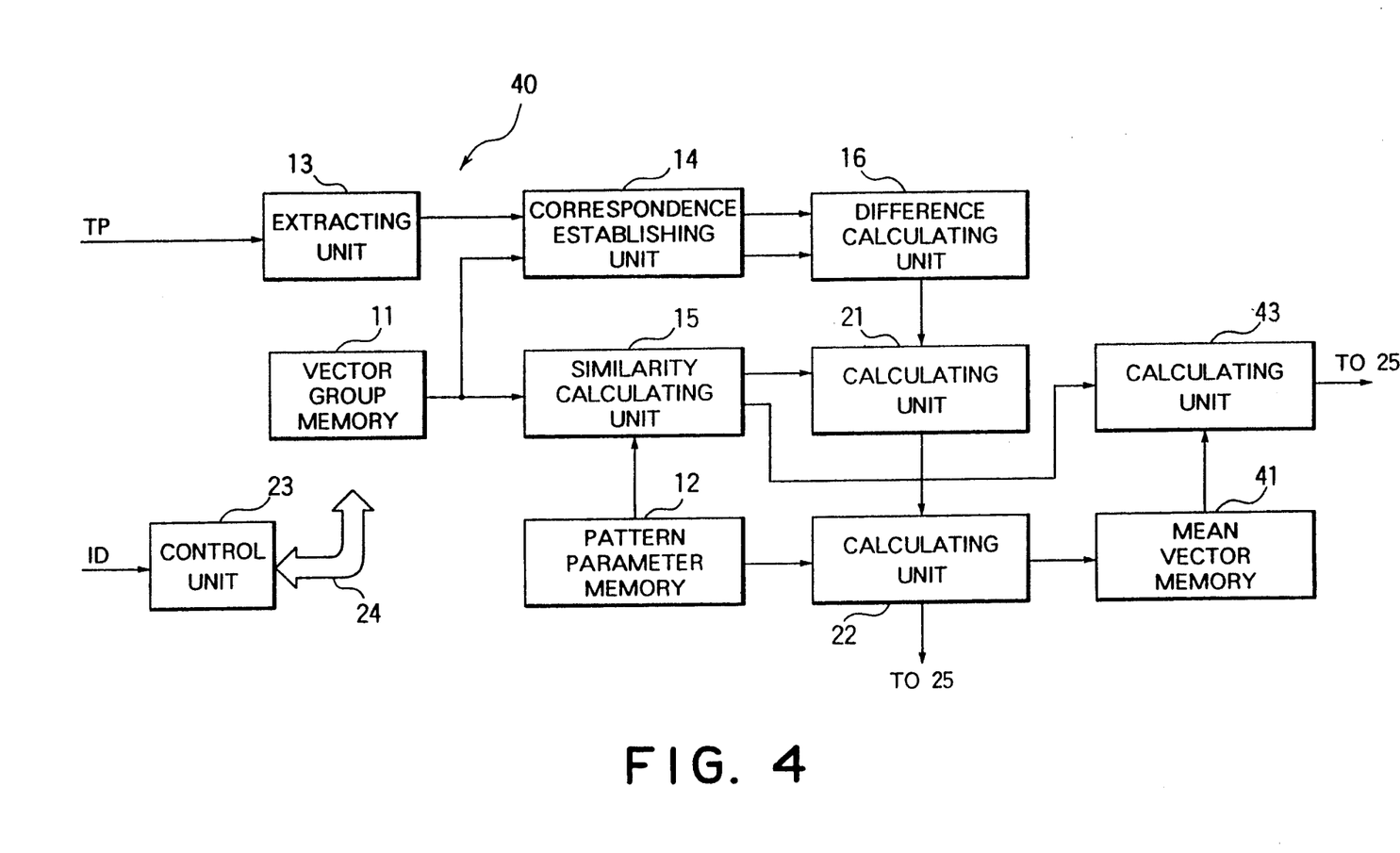
FIG. 4 is a block diagram of a reference pattern adapting device according to a third embodiment of this invention.

Referring to FIG. 4, the description will proceed to a reference pattern adapting device 40 according to a third embodiment of this invention.

The reference pattern adapting device 40 is for adapting the first through the M-th reference pattern parameter groups to the first through the M-th adapted pattern parameter groups by using the first through the L-th training patterns which correspond to the first through the L-th reference patterns, respectively. The reference pattern adapting device 40 comprises similar parts designated by like reference numerals and additionally a mean vector memory 41 and a third calculating unit 43.

As described in conjunction with FIG. 2, the first through the L-th reference pattern parameter groups are classified into the first class or set A. The (L+1)-th through the M-th reference pattern parameter groups are classified into the second class or set B.

In the manner illustrated with reference to FIG. 2, the reference pattern adapting device 40 adapts the first through the L-th reference pattern parameter groups to the first through the L-th adapted pattern parameter groups by using the first through the L-th training patterns. As a result of adaptation, the second calculating unit 22 produces the first through the L-th groups of secondary calculation results representative of the first through the L-th group of primary mean vectors. Each of the first through the L-th groups of primary mean vectors corresponds to each of the first through the L-th adapted pattern parameter groups. The reference pattern adapting device 40 further adapts the (L+1)-th through the M-th reference pattern parameter groups to the (L+1)-th through the M-th adapted pattern parameter groups in the manner which will presently be described.

When the second calculating unit 22 completes calculation of the first through the L-th groups of primary mean vectors, the control unit 23 activates the second calculating unit 22 to make the second calculating unit 21 supply the first through the L-th groups of secondary calculation results representative of the first through the L-th groups of primary mean vectors to the mean vector memory 41. The mean vector memory 41 memorizes the first through the L-th groups of primary mean vectors as first through L-th groups of memorized primary mean vectors. Each of the primary mean vectors of each of the first through the L-th groups is represented, as an (A)j-th adapted mean vector by $\mu(A)j$.

Simultaneously with supply of the first through the L-th groups of secondary calculation results, the control unit 23 activates the pattern parameter memory 12 to make the pattern parameter memory 12 supply the first through the M-th memorized pattern parameter groups to the similarity calculating unit 15. Supplied with the first through the M-th memorized pattern parameter groups, the similarity calculating unit 15 calculates a group of secondary degrees of similarity between each of the first through the L-th memorized pattern parameter groups and each of the (L+1)-th through the M-th memorized pattern parameter groups in accordance with Equations (6) and (7). Each of the secondary degrees of similarity is represented, as a (B)ij-th secondary degree of similarity, by $W(B)ij$. The similarity calculating unit 15 supplies a group of secondary calculation results representative of the group of secondary degrees of similarity to the third calculating unit 43. Simultaneously with supply of the group of secondary calculation results, the control unit 23 activates the mean vector memory 41 to make the mean vector memory 41 supply the first through the L-th group of memorized primary mean vectors to the third calculating unit 43.

Supplied with the group of secondary calculation results and the first through the L-th group of memorized primary mean vectors, the third calculating unit 43 calculates a group of secondary mean vectors in accordance with the following equation:

$$\mu(B)i = \left[\sum_{j \in A} W(B)ij\mu(A)j\right] / \left[\sum_{j \in A} W(B)ij\right]. \quad (10)$$

The third calculating unit 43 supplies another group of secondary calculation results representative of the group of secondary mean vectors as one of the (L+1)-th through the M-th adapted pattern parameter groups to the identifier 25 described in conjunction with FIG. 1.

In this manner, the (L+1)-th through the M-th reference pattern parameter groups are adapted to the (L+1)-th through the M-th adapted pattern parameter groups by using the pattern parameter memory 12, the similarity calculating unit 15, the mean vector memory 41, and the third calculating unit 43.

Figure 5:
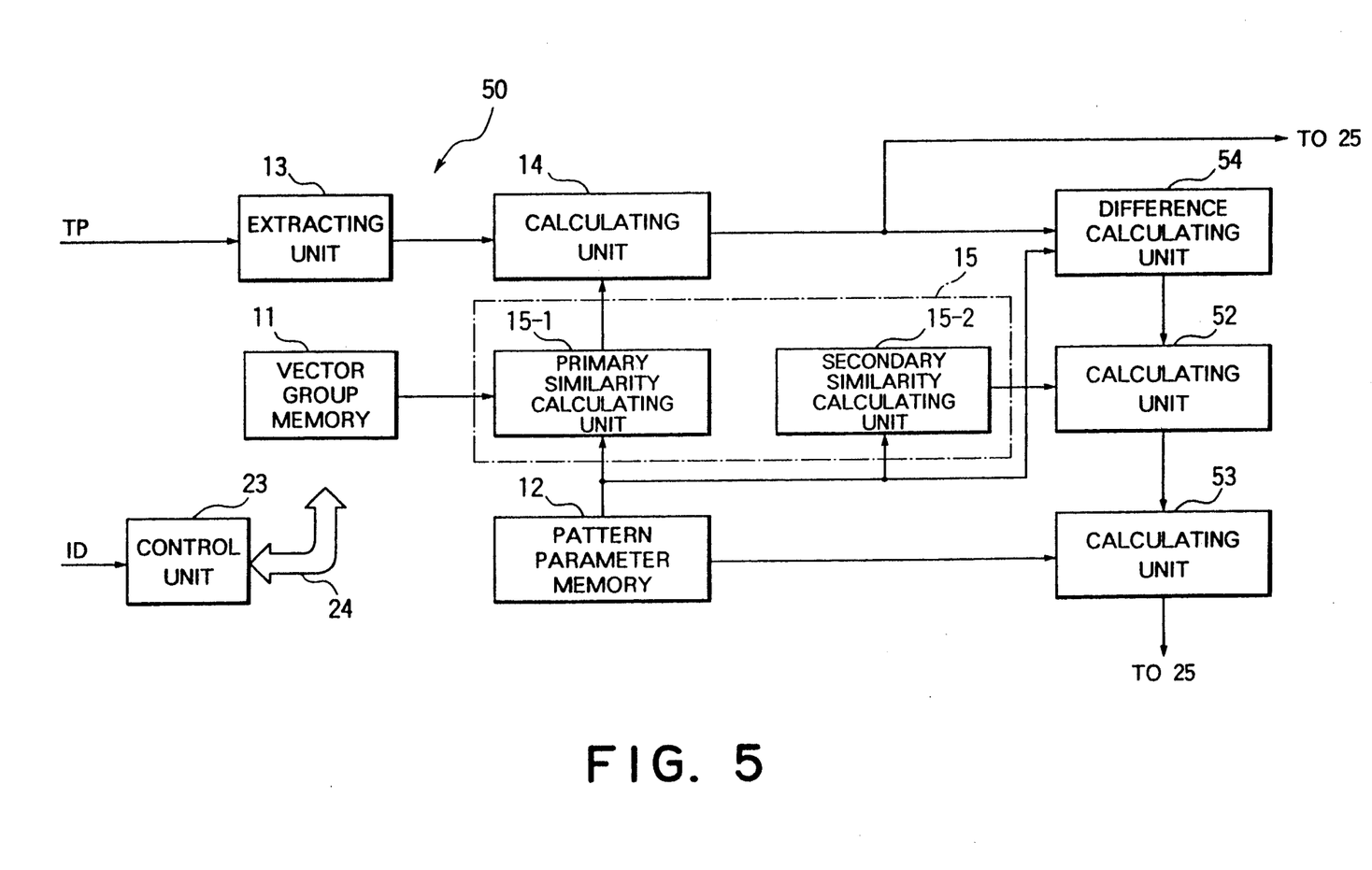
FIG. 5 is a block diagram of a reference pattern adapting device according to a fourth embodiment of this invention.

Referring to FIG. 5, the description will proceed to a reference pattern adapting device 50 according to a fourth embodiment of this invention.

The reference pattern adapting device 50 is for adapting the first through the M-th reference pattern parameter groups to the first through the M-th adapted pattern parameter groups by using the first through the L-th training patterns which correspond to the first through the L-th reference patterns, respectively. The reference pattern adapting device 50 comprises similar parts designated by like reference numerals and additionally first through third calculating units 51, 52, and 53, and a difference calculating unit 54. The similarity calculating unit 15 comprises a primary similarity calculating unit 15-1 and a secondary similarity calculating unit 15-2.

As described in conjunction with FIG. 2, the first through the L-th reference pattern parameter groups are classified into the first class or set A. The (L+1)-th through the M-th reference pattern parameter groups are classified into the second class or set B.

The vector group memory 11 memorizes the first through the M-th groups of reference feature vectors as first through M-th memorized feature vector groups. The pattern parameter memory 12 memorizes the first through the M-th reference pattern parameter groups as first through M-th memorized pattern parameter groups.

Let the reference pattern adapting device 50 be supplied with the training pattern signal TD representative of the first training pattern as a first pattern signal. In this event, the control unit 23 is supplied with the identification signal ID indicative of the first training pattern as a first identification signal.

Supplied with the first pattern signal, the extracting unit 13 extracts the first group of training feature vectors representative of the first training pattern as a first extracted vector group. The first extracted vector group corresponds to the first group of reference feature vectors and consists of the first through the Ti-th training feature vectors. Each of the first through the Ti-th training feature vectors is represented, as a (k,i)-th training feature vector, by Yik. The first extracted vector group is delivered to the first calculating unit 51.

When the first identification signal is supplied to the control unit 23, the control unit 23 activates the vector group memory 11 and the pattern parameter memory 12 to make the vector group memory 11 and the pattern parameter memory 12 supply the first memorized feature vector group and the first memorized pattern parameter group to the similarity calculating unit 15. The first memorized feature vector group consists of the first through the Ni-th reference feature vectors. Each of the first through the Ni-th reference feature vectors is represented, as an (k,i)-th reference feature vector, by Xik. The first memorized pattern parameter group consists of the first through the Ns-th reference pattern parameters represented by the first through the Ns-th mean vectors. Each of the first through the Ns-th mean vectors is represented, as an i-th mean vector, by $\mu_i$. Supplied with the first memorized feature vector group and the first memorized pattern parameter group, the primary similarity calculating unit 15-1 calculates a group of primary degrees of similarity between the first memorized feature vector group and the first memorized pattern parameter group in accordance with Equations (1) and (2). Each of primary degrees of similarity is represented, as an (A)ik-th primary degree of similarity, by W(A)ik. The primary similarity calculating unit 15-1 supplies the group of primary degrees of similarity to the first calculating unit 51.

Supplied from the extracting unit and the primary similarity calculating unit 15-1 with the first extracted vector group and the group of primary degrees of similarity, the first calculating unit 51 calculates a group of primary mean vectors in accordance with the following equation:

$$\mu(A)i = \left[\sum_{k=1}^{Ni} W(A)ik Yik\right] / \left[\sum_{k=1}^{Ni} W(A)ik\right]. \quad (11)$$

The first calculating unit 51 supplies a group of primary calculation results to the difference calculating unit 54 and the identifier 25 (FIG. 1). The group of primary calculation results represents the group of primary mean vectors as one of the first through the L-th adapted pattern parameter groups among the first through the M-th adapted pattern parameter groups. The above-mentioned operation applies to a second training pattern through the L-th training pattern.

In this manner, the first through the L-th reference pattern parameter groups are adapted to the first through the L-th adapted pattern parameter groups by using the vector group memory 11, the pattern parameter memory 12, the extracting unit 13, the primary similarity calculating unit 15-1, and the first calculating unit 51.

Simultaneously with supply of the group of the primary calculation results, the control unit 23 activates the pattern parameter memory 12 to make the pattern parameter memory 12 supply the first memorized pattern parameter group to the difference calculating unit 54. Supplied with the group of the primary calculation results and the first memorized pattern parameter group, the difference calculating unit 54 calculates a group of differences between the group of primary mean vectors and the first memorized pattern parameter group. Each of the primary mean vector is represented, as an (A)j-th primary mean vector, by $\mu(A)j$. Each of the first through the Ns-th reference patterns is represented, as an (A)j-th mean vector, by $\mu(A)j$. Including a difference calculation result register (not shown), the difference calculating unit 54 memorizes the group of difference as a memorized group of differences.

When the difference calculating unit 54 completes calculation of the group of differences, the control unit 23 activates the pattern parameter memory 12 to make the pattern parameter memory 12 supply the first through the M-th memorized pattern parameter groups to the secondary similarity calculating unit 15-2. Supplied with the first through the M-th memorized pattern parameter groups, the secondary similarity calculating unit 15-2 calculates a group of secondary degrees of similarity between each of the first through the L-th memorized pattern parameter groups and each of the (L+1)-th through the M-th memorized pattern parameter groups in accordance with Equations (6) and (7). Each of the secondary degrees of similarity is represented, as a (B)ij-th secondary degree of similarity, by W(B)ij. The secondary similarity calculating unit 15-2 delivers a group of secondary calculation results representative of the group of secondary degrees of similarity to the second calculating unit 52. Simultaneously with delivery of the group of secondary calculation results, the control unit 23 activates the difference calculating unit 54 to make the difference calculating unit 54 supply a difference signal representative of the memorized group of differences to the second calculating unit 52.

Supplied with the group of secondary calculation results representative of the group of secondary degrees of similarity and the difference signal representative of the memorized group of differences, the second calculating unit 52 calculates a group of difference vectors in accordance with Equation (8). Including a difference vector memory (not shown), the second calculating unit 52 memorizes the group of difference vectors as memorized difference vectors. Each of the secondary difference vectors is represented, as a (B)i-th secondary difference vector, by $\Delta(B)i$.

When the second calculating unit 52 completes calculation of the group of secondary difference vectors, the control unit 23 activates the pattern parameter memory 12 to make the pattern parameter memory 12 supply the L-th through the M-th reference pattern parameter groups to the third calculating unit 53. Each of the mean vectors of each of the L-th through the M-th reference pattern parameter groups is represented, as a (B)i-th mean vector, by $\mu(B)i$. The third calculating unit 53 calculates a group of secondary mean vectors by using the group of the secondary difference vectors and one of the L-th through the M-th reference pattern parameter groups in accordance with Equation (9). The third calculating unit 53 produces another group of secondary calculation results representative of the group of secondary mean vectors as one of the (L+1)-th through the M-th adapted pattern parameter groups.

In this manner, the (L+1)-th through the M-th reference pattern parameter groups are adapted to the (L+1)-th through the M-th adapted pattern parameter groups by using the secondary similarity calculating unit 15-2, the second and the third calculating units 52 and 53, and the difference calculating unit 54.

Figure 6:
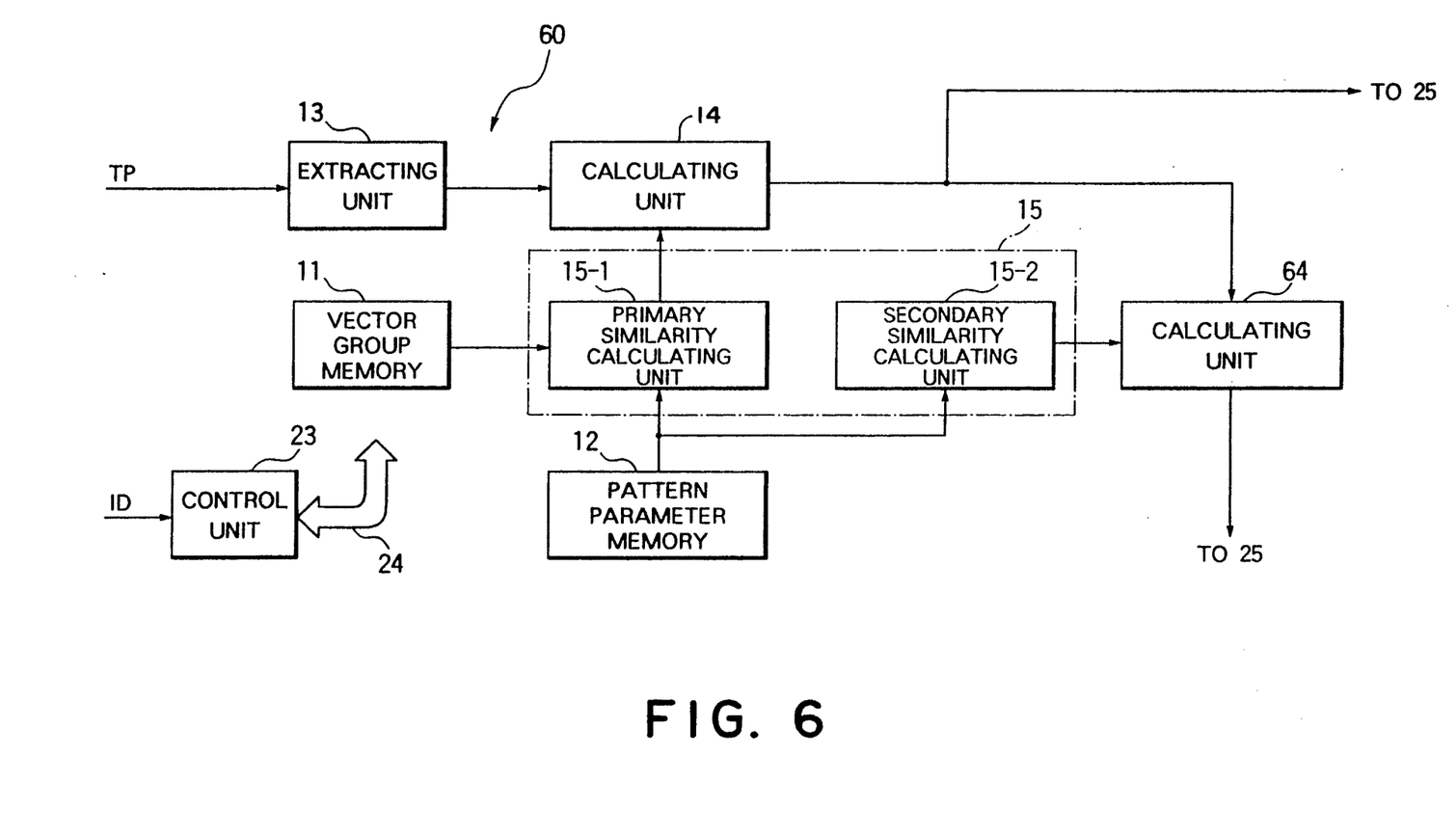
FIG. 6 is a block diagram of a reference pattern adapting device according to a fifth embodiment of this invention.

Referring to FIG. 6, the description will proceed to a reference pattern adapting device 60 according to a fifth embodiment of this invention.

The reference pattern adapting device 60 is for adapting the first through the M-th reference pattern parameter groups to the first through the M-th adapted pattern parameter groups by using the first through the L-th training patterns. The reference pattern adapting device 60 comprises similar parts designated by like reference numerals and additionally a fourth calculating units 64.

As described in conjunction with FIG. 2, the first through the L-th reference pattern parameter groups are classified into the first class or set A. The (L+1)-th through the M-th reference pattern parameter groups are classified into the second class or set B.

In the manner described with reference to FIG. 5, the first through the L-th reference pattern parameter groups are adapted to the first through the L-th adapted pattern parameter groups by using the vector group memory 11, the pattern parameter memory 12, the extracting unit 13, the similarity calculating unit 15, and the first calculating unit 51. As a result of adaptation, the first calculating unit 51 supplies the group of primary calculation results to the identifier 25 (FIG. 1).

Including a first calculation result register (not shown), the first calculating unit 51 memorizes the group of primary calculation results as a memorized group of primary calculation results. The group of primary calculation results represents the group of primary mean vectors as one of the first through the L-th adapted pattern parameter groups among the first through the M-th adapted pattern parameter groups. Each of the primary mean vectors is represented, as an (A)j-th primary mean vector, by $\mu(A)j$.

Simultaneously with supply of the group of the primary calculation results, the control unit 23 activates the pattern parameter memory 12 to make the pattern parameter memory 12 supply the first through the M-th memorized pattern parameter groups to the secondary similarity calculating unit 15-2. Supplied with the first through the M-th memorized pattern parameter groups, the secondary similarity calculating unit 15-2 calculates a group of secondary degrees of similarity between each of the first through the L-th memorized pattern parameter groups and each of the (L+1)-th through the M-th memorized pattern parameter groups in accordance with Equations (6) and (7). Each of the secondary degrees of similarity is represented, as the (B)ij-th secondary degree of similarity, by $W(B)ij$. The secondary similarity calculating unit 15-2 delivers a group of secondary calculation results representative of the group of secondary degrees of similarity to the fourth calculation unit 64.

Simultaneously with delivery of the group of secondary calculation results, the control unit 23 activates the first calculating unit 51 to make the first calculating unit 51 supply the memorized group of primary calculation results to the fourth calculating unit 64. Supplied with the group of primary calculation results and the memorized group of secondary calculation results, the third calculating unit 43 calculates a group of secondary mean vectors in accordance with Equation (10). The fourth calculating unit 64 produces another group of secondary calculation results representative of the group of secondary mean vectors as one of the (L+1)-th through the M-th adapted pattern parameter groups.

In this manner, the (L+1)-th through the M-th reference pattern parameter groups are adapted to the (L+1)-th through the M-th adapted pattern parameter groups by using the fourth calculating unit 64.

While this invention has thus far been described in conjunction with a few embodiment thereof, it will readily be possible for those skilled in the art to put this invention into practice in various other manners. For example, adapting operation may be carried out by using the covariance $\sigma_i^2$ or the transition probability $a_{ij}$ instead of the mean vector $\mu_i$. The reference pattern adapting device is useful in a character or similar pattern recognition device.

What is claimed is:

1. A reference pattern adapting device for using first through L-th training patterns in adapting first through M-th reference pattern parameter groups to first through M-th adapted pattern parameter groups, where M represents a first integer, L represents a second integer which is not greater than said first integer, said first through said M-th reference pattern parameter groups characterizing first through M-th reference patterns, said first reference pattern parameter group through an L-th reference pattern group being classified into a first class, an (L+1)-th reference pattern parameter group through said M-th reference pattern parameter group being classified into a second class, said device comprising:

an element group memory for memorizing first through M-th groups of reference pattern elements as first through M-th memorized pattern element groups, said first through said M-th groups representing said first through said M-th reference patterns;

an extracting unit supplied with said first through said L-th training patterns for extracting a group of training pattern elements representative of one of said first through said L-th training patterns at a time from said first through said L-th training patterns, said group of training pattern elements corresponding to one of said first through said L-th reference pattern parameter groups;

a pattern parameter memory for memorizing said first through said M-th reference pattern parameter groups as first through M-th memorized pattern parameter groups;

a correspondence establishing unit connected to said element group memory and said extracting unit for establishing correspondence between the reference pattern elements of each of said first memorized pattern element group through an L-th memorized pattern element group and the training pattern elements of said group into a plurality of pairs, said first through said L-th memorized pattern element groups representing said first reference pattern through an L-th reference pattern characterized by said first through said L-th reference pattern parameter groups, each of said pairs consisting of one of the reference pattern elements of each of said first through said L-th memorized pattern element groups and one of the training pattern elements that corresponds in said group of training pattern elements to said one of the reference pattern elements;

a similarity calculating unit connected to said element group memory and said pattern parameter memory for calculating a group of primary degrees of similarity between each of said first memorized pattern element group through an L-th memorized pattern element group and each of said first memorized pattern parameter group through an L-th memorized pattern parameter group to produce a group of primary calculation results representative of said primary degrees of similarity, said L-th memorized pattern element group being the L-th group of reference pattern elements which is memorized in said element group memory to represent an L-th reference pattern characterized by said L-th reference pattern parameter group, said L-th memorized pattern parameter group being the L-th reference pattern parameter group memorized in said pattern parameter memory;

a difference calculating unit connected to said correspondence establishing unit for calculating a group of differences between the reference pattern elements and the training pattern elements in said plurality of pairs to produce a difference signal representative of said group of differences;

a first calculating unit connected to said similarity calculating unit and said difference calculating unit for calculating a group of primary difference values by using said group of primary degrees of similarity and said group of differences to produce a group of primary difference calculation results representative of said group of said primary difference values; and a second calculating unit connected to said pattern parameter memory and said first calculating unit for calculating a group of primary means values by using said each of the first through the L-th memorized pattern parameter groups and said group of said primary difference values to produce a group of secondary calculation results representative of said group of primary means values as one of said first adapted pattern parameter group through an L-th adapted pattern parameter group among said first through said M-th adapted pattern parameter groups.

2. A reference pattern adapting device as claimed in claim 1, further comprising:

a difference value memory connected to said first calculating unit for memorizing said group of said primary difference values as a memorized difference value group;

said similarity calculating unit further calculating a group of secondary degrees of similarity between each of said first through said L-th memorized pattern parameter groups and each of an (L+1)-th memorized pattern parameter group through said M-th memorized pattern parameter group to produce a group of secondary calculation results representative of said group of secondary degrees of similarity, said (L+1)-th memorized pattern parameter group being the (L+1)-th reference pattern parameter group memorized in said pattern parameter memory;

said first calculating unit being supplied with said memorized difference value group for further calculating a group of secondary difference values by using said group of secondary degrees of similarity and said memorized difference value group to produce a group of secondary difference calculation results representative of said group of said secondary difference values;

said second calculating unit further calculating a group of secondary mean values by using each of said (L+1)-th through said M-th memorized pattern parameter groups and said group of said secondary difference values to produce another group of secondary calculation results representative of said group of secondary mean values as one of an (L+1)-th adapted pattern parameter group through said M-th adapted pattern parameter group among said first through said M-th adapted pattern parameter groups.

3. A reference pattern adapting device as claimed in claim 1, wherein said similarity calculating unit further calculates a group of secondary degrees of similarity between each of said first through said L-th memorized pattern parameter groups and each of an (L+1)-th memorized pattern parameter group through said M-th memorized pattern parameter group to produce a group of secondary calculation results representative of said group of secondary degrees of similarity, said (L+1)-th memorized pattern parameter group being the (L+1)-th reference pattern parameter group memorized in said pattern parameter memory, said device further comprising:

a mean value memory connected to said second calculating unit for memorizing said group of primary mean values as a memorized mean value group; and a third calculating unit connected to said similarity calculating unit and said mean value memory for calculating a group of secondary mean values by using said group of secondary degrees of similarity and said memorized mean value group to produce another group of secondary calculation results representative of said group of secondary mean values as one of an (L+1)-th adapted pattern parameter group through said M-th adapted pattern parameter group among said first through said M-th adapted pattern parameter groups.

4. A reference pattern adapting device for using first through L-th training patterns in adapting first through M-th reference pattern parameter groups to first through M-th adapted pattern parameter groups, where M represents a first integer, L represents a second integer which is not greater than said first integer, said first through said M-th reference pattern parameter groups characterizing first through M-th reference patterns, said first reference pattern parameter group through an L-th reference pattern parameter group being classified into a first class, an (L+1)-th reference pattern parameter group through said M-th reference pattern parameter group being classified into a second class, said device comprising:

an element group memory for memorizing first through M-th groups of reference pattern elements as first through M-th memorized pattern element groups, said first through said M-th groups representing said first through said M-th reference patterns;

an extracting unit supplied with said first through said L-th training patterns for extracting a group of training pattern elements representative of one of said first through said L-th training patterns at a time from said first through said L-th training patterns, said group of training pattern elements corresponding to one of said first through said L-th reference pattern parameter groups;

a pattern parameter memory for memorizing said first through said M-th reference pattern parameter groups as first through M-th memorized pattern parameter groups;

a primary similarity calculating unit connected to said element group memory and said pattern parameter memory for calculating a group of primary degrees of similarity between each of said first memorized pattern element group through an L-th memorized pattern element group and each of said first memorized pattern parameter group through an L-th memorized pattern parameter group to produce a group of primary calculation results representative of said group of primary degrees of similarity, said L-th memorized pattern element group being the L-th group of reference pattern elements which is memorized in said element group memory to represent an L-th reference pattern characterized by said L-th reference pattern parameter group, said memorized pattern parameter group being the L-th reference pattern parameter group memorized in said pattern parameter memory;

a first calculating unit connected to said extracting unit and said primary similarity calculating unit for calculating a group of primary mean values by using said group of training pattern elements and said group of primary degrees of similarity to produce a group of primary calculation results representative of said group of primary mean values as one of said first adapted pattern parameter group through an L-th adapted pattern parameter group among said first through said M-th adapted pattern parameter groups;

a difference calculating unit connected to said pattern parameter memory and said first calculating unit for calculating a group of differences between each of said first through said L-th memorized pattern parameter groups and said group of primary mean values to produce a difference signal representative of said group of differences;

a secondary similarity calculating unit connected to said pattern parameter memory for calculating a group of secondary degrees of similarity between each of said first through said L-th memorized pattern parameter groups and each of an $(L+1)$-th memorized pattern parameter group through said M-th memorized pattern parameter group to produce a group of secondary calculation results representative of said group of secondary degrees of similarity;

a second calculating unit connected to said difference calculating unit and said secondary similarity calculating unit for calculating a group of difference values by using said group of differences and said group of secondary degrees of similarity to produce a group of second calculation results representative of said group of said difference values; and a third calculating unit connected to said pattern parameter memory and said second calculating unit for calculating a group of secondary mean values by using said $(L+1)$-th through said M-th memorized pattern parameter groups and said group of said difference values to produce a group of third calculation results representative of said group of secondary mean values as one of an $(L+1)$-th adapted pattern parameter group through said M-th adapted pattern parameter group among said first through said M-th adapted pattern parameter groups.

5. A reference pattern adapting device for using first through L-th training patterns in adapting first through M-th reference pattern parameter groups to first through M-th adapted pattern parameter groups, where M represents a first integer, L represents a second integer which is not greater than said first integer, said first through said M-th reference pattern parameter groups characterizing first through M-th reference patterns, said first reference pattern parameter group through an L-th reference pattern parameter group being classified into a first class, an $(L+1)$-th reference pattern parameter group through said M-th reference pattern parameter group being classified into a second class, said device comprising:

an element group memory for memorizing first through M-th groups of reference pattern elements as first through M-th memorized pattern element groups, said first through said M-th groups representing said first through said M-th reference patterns;

an extracting unit supplied with said first through said L-th training patterns for extracting a group of training pattern elements representative of one of said first through said L-th training patterns at a time from said first through said L-th training patterns, said group of training pattern elements corresponding to one of said first through said L-th reference pattern parameter groups;

a pattern parameter memory for memorizing said first through said M-th reference pattern parameter groups as first through M-th memorized pattern parameter groups;

a primary similarity calculating unit connected to said element group memory and said pattern parameter memory for calculating a group of primary degrees of similarity between each of said first memorized pattern element group through an L-th memorized pattern element group and each of said first memorized pattern parameter group through an L-th memorized pattern parameter group to produce a group of primary calculation results representative of said group of primary degrees of similarity, said L-th memorized pattern element group being the L-th group of reference pattern elements which is memorized in said element group memory to represent an L-th reference pattern characterized by said L-th reference pattern parameter group, said L-th memorized pattern parameter group being the L-th reference pattern parameter group memorized in said pattern parameter memory;

a first calculating unit connected to said extracting unit and said primary similarity calculating unit for calculating a group of primary mean values by using said group of training pattern elements and said group of primary degrees of similarity to produce a group of primary calculation results representative of said group of primary mean values as one of said first adapted pattern parameter group through an L-th adapted pattern parameter group among said first through said M-th adapted pattern parameter groups;

a difference calculating unit connected to said pattern parameter memory and said first calculating unit for calculating a group of differences between each of said first through said L-th memorized pattern parameter groups and said group of primary mean values to produce a difference signal representative of said group of differences;

a secondary similarity calculating unit connected to said pattern parameter memory for calculating a group of secondary degrees of similarity between each of said first through said L-th memorized pattern parameter groups and each of an $(L+1)$-th memorized pattern parameter group through said M-th memorized pattern parameter group to produce a group of secondary calculation results representative of said group of secondary degrees of similarity; and a second calculating unit connected to said first calculating unit and said secondary similarity calculating unit for calculating a group of secondary mean values by using said group of primary mean values and said group of secondary degrees of similarity to produce another group of calculation results representative of said group of secondary mean values as one of an $(L+1)$-th adapted pattern parameter group through said M-th adapted pattern parameter group among said first through said M-th adapted pattern parameter groups.

* * * * *